United States Patent [19]

Heiz

[11] Patent Number: 4,508,484
[45] Date of Patent: Apr. 2, 1985

[54] INSTALLATION FOR THE AUTOMATIC REMOVAL AND RECEPTION OF LOADS THROUGH THE INTERMEDIARY OF TRANSPORT VEHICLES

[75] Inventor: Ulrich Heiz, Säriswil, Switzerland

[73] Assignee: Inventio AG, Hergiswil, Switzerland

[21] Appl. No.: 387,844

[22] PCT Filed: Sep. 30, 1981

[86] PCT No.: PCT/CH81/00109
§ 371 Date: Jun. 1, 1982
§ 102(e) Date: Jun. 1, 1982

[30] Foreign Application Priority Data

Oct. 21, 1980 [CH] Switzerland .................. 7830/80

[51] Int. Cl.³ .................................... B65G 67/00
[52] U.S. Cl. ................................... 414/337; 198/597; 414/338
[58] Field of Search ............. 414/337, 338, 389, 390, 414/398, 434, 437, 439, 440; 198/597, 598, 680, 835, 834

[56] References Cited

U.S. PATENT DOCUMENTS

| 1,332,866 | 6/1917 | Emerson | 414/398 |
| 3,214,037 | 10/1965 | Schindler et al. | 414/389 |
| 3,877,588 | 4/1975 | Meisel | 198/835 |
| 4,163,488 | 8/1979 | Brook | 198/504 |

FOREIGN PATENT DOCUMENTS

| 452981 | 11/1927 | Fed. Rep. of Germany . |
| 1002245 | 7/1957 | Fed. Rep. of Germany . |
| 1943854 | 3/1971 | Fed. Rep. of Germany . |
| 693353 | 11/1930 | France . |
| 639043 | 10/1983 | Switzerland . |
| 249685 | 4/1926 | United Kingdom . |

Primary Examiner—Joseph E. Valenza
Assistant Examiner—Stuart Millman
Attorney, Agent, or Firm—Werner W. Kleeman

[57] ABSTRACT

The transport installation comprises a reception station and a transport vehicle between which a load can be displaced in a horizontal plane by movement of the vehicle. To avoid the necessity of raising the transport vehicle or of having recourse to an auxiliary vehicle, an endless conveyor, extending in the direction of displacement of the transport vehicle is provided at the reception station. The endless conveyor comprises a horizontal portion for receiving the load and this portion is preceded by a downwardly inclined portion intersecting the horizontal plane along which the load can be transported. At least one drive wheel, co-operating with a corresponding drive element carried by the transport vehicle, is provided at the reception station for driving the endless conveyor at the same time as the transport vehicle.

16 Claims, 6 Drawing Figures

INSTALLATION FOR THE AUTOMATIC REMOVAL AND RECEPTION OF LOADS THROUGH THE INTERMEDIARY OF TRANSPORT VEHICLES

BACKGROUND OF THE INVENTION

The present invention relates to a new and improved installation for the automatic removal and reception of loads through the intermediary of transport vehicles, in which by means of the movement of a transport vehicle displaced relatively to a reception station, a load transportable in a horizontal plane by the transport vehicle can be removed from the transport vehicle and be placed on the reception station and/or vice-versa.

In installations of such type the movement of the transporting vehicle solely determines the removal of the load from the vehicle and its deposition at a reception station or vice versa. This has the advantage of reducing the risk that a displacement in the longitudinal direction may be produced between the transported load and the transport vehicle during the above-mentioned operations.

One known installation of this type, more precisely intended for the automatic reception of pallets from transport wagons, on two parallel roller paths disposed stationarily at a reception station, is illustrated in published German patent application No. 1 943 854. In this installation, each transport wagon is equipped with vertical supports, on which the load may be placed in such a way that it can be raised. By means of the access ramp of a stationary platform disposed at the reception station along the path of the wagon, the transport wagon is raised until the load which it carries is situated above the two roller tracks. During the descending movement of the wagon as it leaves the platform the load is released and comes to rest upon the rollers of the two roller tracks.

Due to the fact that the transport vehicle and the transported load have to be raised together each time by the ramp of the platform, such an installation is not very well adapted for the removal and reception of heavy loads. Another disadvantage lies in the fact that the platform, for which a horizontal reception portion and two inclined portions respectively for access and departure are necessary, appreciably increases the length of the installation, the more so when the loads transported are of great length. Finally, this type of installation would scarcely be suitable if the operations were to be reversed, that is if the load had to be removed from the roller tracks and be deposited upon the transport wagon. In this case, it is the transport wagon which, during an ascending movement, would have to entrain with it the horizontally disposed load. Such an operation could only be carried out with the aid of appropriate entraining elements, and the load would have to be placed on each occasion upon the transport tracks with great precision relative to the platform.

In another installation, shown in British Pat. No. 249 685, loads to be transferred from a transport vehicle to a reception station have to be carried by the intermediary of an auxiliary vehicle itself disposed upon the transport vehicle. During the displacement of the transport vehicle relative to the reception station, the wheels of the auxiliary vehicle engage upon the inclined ends of rails provided at the reception station and upon which the auxiliary vehicle and the loads which it carries can be placed.

Apart from the fact that it neccessitates the use of an auxiliary vehicle this installation demands that the transport vehicle shall be equipped with retaining elements capable of being automatically engaged or disengaged according to whether the auxiliary vehicle is to be entrained by the transport vehicle or released.

SUMMARY OF THE INVENTION

Therefore, with the foregoing in mind it is a primary object of the present invention to provide an improved installation for the automatic removal and reception of loads through the intermediary of transport vehicles which is of a relatively simple construction and neither requires a raising of the transport vehicle nor the use of an auxiliary vehicle carried thereby.

Now in order to implement these and still further objects of the invention, which will become more readily apparent as the description proceeds, the installation of the present development is manifested by the features that, an endless conveyor is provided at the reception station and is carried by a stationary frame and extends in the direction of the transport vehicle displacement. The endless conveyor comprises a substantially horizontal load transport portion for reception of the load and is preceded by a downwardly inclined load transport or transfer portion which intersects the horizontal plane in which the load can be transported by the transport vehicle. At the reception station there is provided at least one drive wheel which is rotationally entrained by a drive element during horizontal displacement of the transport vehicle relative to the reception station. The drive element is carried by the transport vehicle and extends longitudinally of the direction of displacement. The endless conveyor can be entrained by the at least one drive wheel during movement of the transport vehicle and is then moved in the same direction and at the same speed as the transport vehicle.

By the fact that it employs an endless conveyor which, on the one hand, possesses an inclined portion capable, depending upon the particular case, of raising or lowering the load and, on the other hand, is driven by the transport vehicle, the installation according to the present invention not only has the advantage of demanding only a single horizontal movement of the transport vehicle, but it also enables the necessity of equipping the transport vehicle with pushing and/or retaining elements acting upon the load during the operations to be avoided.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
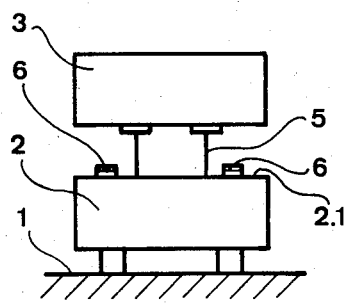
FIG. 1 is a diagrammatic front view of a first embodiment of a transport installation according to the invention and shows a load carrying vehicle thereof.
Figure 2:
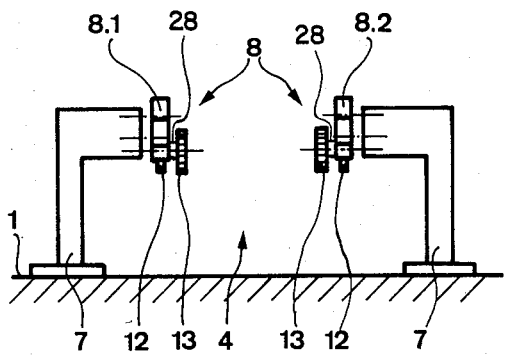
FIG. 2 is a diagrammatic front view of a load reception station in the transport installation as shown in FIG. 1.

Describing now the drawings, it is to be understood that only enough of the construction of the transport installation has been shown as needed for those skilled in the art to readily understand the underlying principles and concepts of the present development, while simplifying the showing of the drawings. Turning attention now specifically to FIGS. 1 to 4, reference 1 denotes the floor level of a construction on which the transport vehicle 2 is required to move for the purpose of automatically transferring loads 3 from the transport vehicle 2 to a reception station 4 or vice versa. The displacement of the transport vehicle 2 is carried out by drive means consisting, for example, of an autonomous drive installation possibly remotely controlled and equipped with a power source which is likewise autonomous or common to several vehicles, or again of a drive installation common to a set of transport vehicles. Such drive means, which are not directly involved in the present invention, have not been illustrated here.

At the upper part 2.1 of the chassis of the transport vehicle 2, there is provided a load support 5 which extends symmetrically to the longitudinal axis of the transport vehicle 2, and upon which a load 3 can be deposited and transported by the vehicle in a horizontal plane, in other words parallel to the ground surface 1, the width of the load support 5 being less than the width of the transported load 3. The upper part 2.1 of the chassis of the transport vehicle 2 is furthermore equipped with two toothed racks 6, which extend on either side of the load support 5 along the entire length of the transport vehicle 2, that is to say longitudinally to the direction of movement of this vehicle.

Figure 3:
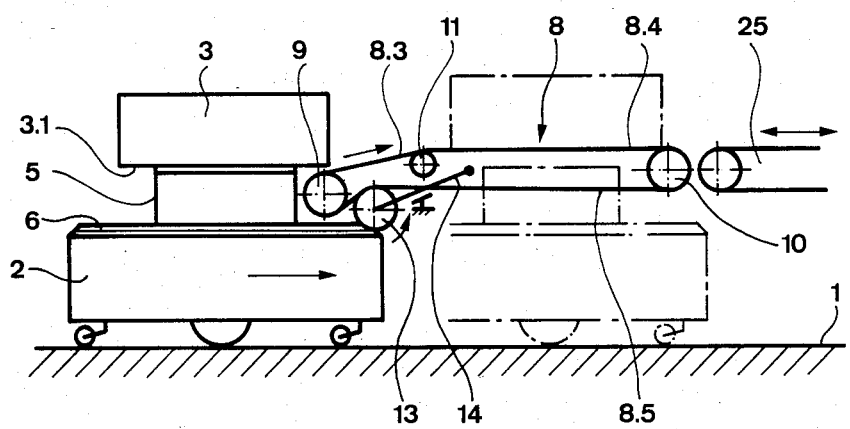
FIGS. 3 and 4 are diagrammatic side views of the transportation installation as shown in FIG. 1 illustrating the displacement of the load from the transport vehicle to the reception station and from the reception station to the transport vehicle, respectively.
Figure 4:
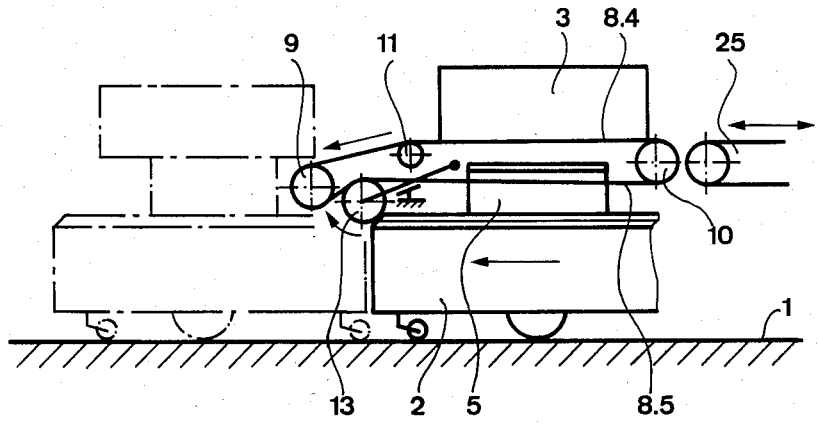

The reception station 4 (FIG. 2) comprises a stationary frame 7, composed of two parallel elements fixed to the ground 1, between which the transport vehicle 2 is required to move. Between the two elements of the stationary frame 7 and extending in the direction of movement of the transport vehicle 2, there is disposed an endless chain conveyor 8 comprising two identical conveyor chains 8.1, 8.2, parallel with each other, each carried by one of the elements of the stationary frame 7 and capable of being driven together in a manner which will be described later on. The two conveyor chains 8.1, 8.2 are carried in a similar manner by the respective element of the stationary frame 7, each by means of two chain return wheels 9, 10 and one guide wheel 11 (FIG. 3 and 4). The axle of the chain wheel 9 situated at the approach or load transfer side for the transport vehicle 2 is disposed lower than the axles of the other two wheels 10 and 11, in such a way that the endless conveyor 8 composed to the two chains 8.1, 8.2 possesses, in the direction of load transfer to or approach of the transport vehicle, a downwardly inclined load transfer portion 8.3 preceding a horizontal load bearing portion 8.4 (FIG. 3 and 4).

The length of the inclined load transfer portion 8.3 is established in such a manner that this inclined portion shall intersect the horizontal plane along which the load 3 can be transported by the transport vehicle 2, in other words the horizontal plane followed by the base 3.1 of the load 3. The lower sides 8.5 of the two conveyor chains 8.1, 8.2 furthermore lie above the horizontal plane of movement of the two toothed racks 6, and the distance separating the two conveyor chains 8.1, 8.2 from each other is greater than the width occupied by the two racks 6, and therefore than the width of the load support 5, whereas it is less than the width of the load 3.

The synchronized drive of the two conveyor chains 8.1, 8.2 is obtained by means of a pair of drive mechanisms each constituted of a chain wheel 12 which actuates the lower side 8.5 of one of the conveyor chains 8.1, 8.2 and is disposed coaxially with a toothed wheel 13, by which it can be rotationally driven. The horizontal axle common to the chain wheel 12 and to the toothed wheel 13 of each drive mechanism is situated lower than the lower side 8.5 of the conveyor chains 8.1, 8.2, and each toothed wheel 13 is disposed upon the axle in such a way as to be capable of engaging with one of the toothed racks 6 when the transport vehicle 2 moves relative to the stationary frame 7. Thus, during the entry of the transport vehicle 2 between the elements of the stationary frame 7 and during its departure from the latter, the two toothed wheels 13 are rotationally driven by the drive elements constituted by the two racks 6. Due to that fact that the chain wheels 12 act upon the lower side 8.5 of the conveyor chains 8.1, 8.2, these chains can be displaced together, at the same time as the transport vehicle 2 and in the same direction. The dimensioning of the chain wheels 12 and of the toothed wheel 13 is moreover established in such a manner that the displacement of the conveyor chains 8.1, 8.2 takes place at the speed of displacement of the transport vehicle 2. Preferably, the axles of the chain wheels 12 and toothed wheels 13 are carried by the stationary frame 7 through the intermediary of pivoting arms 14, by means of which the set of teeth of the toothed wheels 13 can be placed slightly lower down than that of the toothed racks 6 and the conveyor chains 8.1, 8.2 can thereby be subjected to a tension during the movement of the transport vehicle 2.

In the diagrammatic representations of FIGS. 3 and 4 the elements of the stationary frame 7 have been omitted to improve clarity. FIG. 3 shows that, during the displacement of the transport vehicle 2 in the direction of the arrow, that is to say between the two elements of the stationary frame 7, the load 3 will be raised starting from its front portion by the inclined load transfer portion 8.3 of the endless conveyor 8 and will be displaced at the same time as the transport vehicle 2. At the end of travel, the load 3 will be supported only by the horizontal load bearing portion 8.4 of the conveyor, which therefore constitutes a reception portion for the load. Inversely, as shown in FIG. 4, the load 3 disposed upon the horizontal portion 8.4 of the endless conveyor 8 will be lowered by the inclined portion 8.3 and placed upon the load support 5 of the transport vehicle 2 during the displacement of the latter in the opposite direction.

The installation according to the present invention therefore permits, at will, a load situated upon a transport vehicle to be raised and to be deposited upon a reception station or the inverse operations to be carried out, this being achieved by the movement of the vehicle alone and without it being necessary either to raise the transport vehicle or to have recourse to an auxiliary vehicle.

Advantageously, for the purpose of permitting the transport vehicle 2 to be introduced between the elements of the stationary frame 7 or to be moved away from the latter without the endless conveyor 8 being moved, the installation may be equipped with one or more free-wheel clutch mechanisms 28. Such mechanisms are, for example, disposed between each chain wheel 12 and the associated toothed wheel 13 and could be manually or automatically controlled.

FIGS. 3 and 4 show also that a conveyor track, automatic or not, such as a second endless conveyor 25, may be disposed close to the reception station 4 for conveying away or bringing up to the reception station 4 loads 3, for example for the purpose of supplying or clearing working stations. For this purpose, a supplementary drive device capable of driving the endless conveyor 8 without the intervention of the transport vehicle 2 should be provided. This device, which has not been illustrated here, could be composed of drive motors associated respectively with one of the chain return wheels 9 or 10 and be capable of driving, when applicable, the endless conveyor 8 at the same speed as the second endless conveyor 25. If necessary, a free-wheel clutch mechanism could also be associated with this device.

Figure 5:
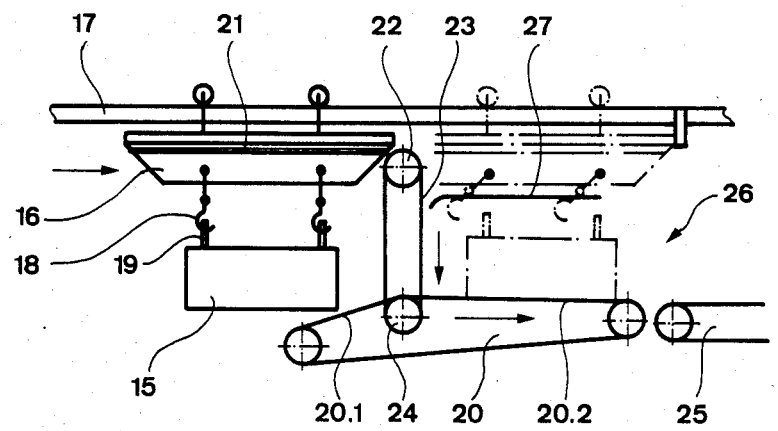
FIG. 5 is a diagrammatic side view of a second embodiment of the transport installation according to the invention incorporating track-suspended transport vehicles and illustrates the removal of a load from a transport vehicle to a reception station.
Figure 6:
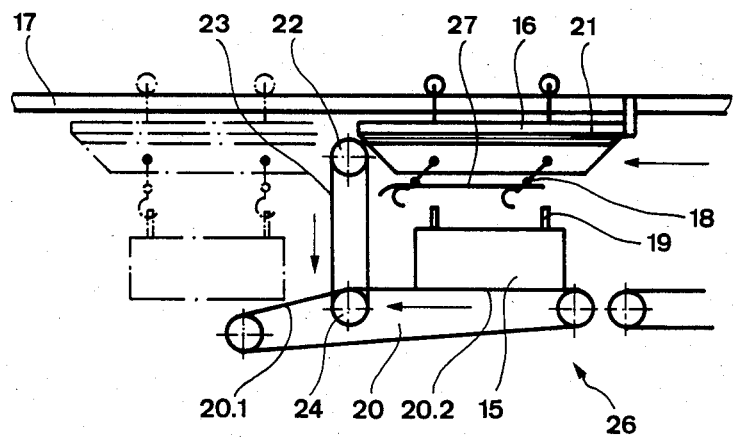
FIG. 6 is a diagrammatic side view of the transport installation as shown in FIG. 5 and illustrates the displacement of the load from the reception station to the transport vehicle.

In the second form of embodiment of the invention, illustrated diagrammatically in FIGS. 5 and 6, the transport vehicle used for the transporting of a load 15 is a transport trolley 16 of a suspended track railway installation. The transport trolley 16, which travels on a guide rail 17, is equipped with attachment devices composed of pivoting hooks 18 to which the load can be hooked through the intermediary of eyes 19. For driving an endless conveyor 20, carried by a stationary frame, not illustrated here, of a reception station 26 and possessing in accordance with this invention an inclined load transfer portion 20.1 intersecting the horizontal plane along which the load 15 is conveyed and a horizontal load bearing portion 20.2 serving for receiving the load, toothed racks 21 are provided on the frame of the transport trolley 16. The driving of the endless conveyor 20 from the movement of the transport trolley 16 is in this case carried out through the intermediary of drive mechanisms comprising drive wheels 22 which engage with the toothed racks 21 and which, through the intermediary of chain wheels and drive chains 23, rotationally drive guide wheels 24 constituted as chain wheels actuating the endless conveyor 20. The positon in height of the horizontal portion 20.2 of the endless conveyor 20 is arranged in such a way that once the load 15 has been placed upon this horizontal portion during its reception (FIG. 5) or for the purpose of its removal (FIG. 6), the mobile hooks 18 are automatically disengaged from the eyes 19. For this purpose, a device for actuating the hooks, constituted of a stationary cam 27, is provided at the reception station. Such a device could equally well consist of one or more motors disposed upon the transport trolley 16 and operated separately or by stationary switching means provided at the reception station.

It is self-evident that other forms of embodiment can be envisaged within the scope of the invention. Thus the two conveyor chains 8.1, 8.2 forming the endless conveyor 8 could be connected together and be driven from the rotation of a single drive wheel 13. Similarly, instead of conveyor chains, other conveying elements such as endless conveyor belts or any other conveying element of similar functioning could be used and the endless conveyor might comprise one only of these conveying elements driven from the rotation of a single drive wheel or two drive wheels. Finally, the driving by mating or meshing of forms envisaged for the drive wheel could be replaced by a friction drive, the drive wheel or wheels being friction wheels entrained by a corresponding friction surface provided on the transport vehicle as the driving element. In this case, a variation of the friction as a function of the load and, consequently, an elimination of the risks of slipping could be obtained by disposing the drive wheel or wheels, as already explained, on tension arms and/or by arranging the endless conveyor assembly to pivot slightly upon the stationary frame.

While there are shown and described present preferred embodiments of the invention, it is to be distinctly understood that the invention is not limited thereto, but may be otherwise variously embodied and practiced within the scope of the following claims.

I claim:

1. A transport installation for automatic displacement of loads, comprising:
   at least one driveable transport vehicle;
   at least one reception station defining a load transfer side;
   said at least one transport vehicle being driveable for substantially horizontal displacement in two opposing directions for load transfer at said at least one reception station;
   said at least one driveable transport vehicle being equipped with load support means defining a substantially horizontal plane for a load to be transported by said driveable transport vehicle;
   said at least one transport vehicle comprising a conveyor drive element extending thereat in the direction of said substantially horizontal displacement;
   said at least one reception station comprising a stationary frame and an endless conveyor supported at said stationary frame;
   said endless conveyor comprising a substantially horizontally extending load bearing portion and a downwardly inclined load transfer portion on said load transfer side of said at least one reception station;
   said load transfer portion extending below said horizontal plane defined by said support means at said at least one driveable transport vehicle; whereby said load may be lifted off said support means when said vehicle travels in a first horizontal direction or delivered onto said support means when the vehicle travels in a second horizontal direction opposite the first;
   said at least one reception station further comprising conveyor drive means;
   said conveyor drive means defining a first end which is drivingly connected to said endless conveyor and a second end which is drivingly connectable to said conveyor drive element at said at least one driveable transport vehicle; and
   said conveyor drive element at said at least one driveable transport vehicle being drivingly connected to said second end of said conveyor drive means during the load transfer at said at least one reception station in a preselected one of said two opposing directions of substantially horizontal displacement of said at least one driveable transport vehicle in order to drive said load transfer portion and said load bearing portion of said endless conveyor at said at least one reception station in the same direction and at the same speed as said at least one transport vehicle is driven.

2. The transport installation as defined in claim 1, wherein:
said conveyor drive means at said at least one reception station comprises at least one toothed wheel at said second end thereof;
said conveyor drive element at said at least one driveable transport vehicle extending in the direction of said horizontal displacement of said transport vehicle and comprising at least one toothed rack; and
said at least one toothed wheel of said conveyor drive means being drivingly connected to said at least one toothed rack at said at least one driveable transport vehicle during said load transfer at said at least one reception station.

3. The transport installation as defined in claim 2, wherein:
said at least one toothed wheel at said second end of said conveyor drive means and said at least one toothed rack at said at least one driveable transport vehicle being disposed below said inclined load transfer portion of said endless conveyor;
said endless conveyor defines a bottom side remote from said load transfer portion and said load bearing portion thereof; and
said first end of said conveyor drive means being drivingly connected to said bottom side of said endless conveyor.

4. The transport installation as defined in claim 3, wherein:
said endless conveyor comprises a chain conveyor including at least one conveying chain which extends in the direction of said horizontal displacement of said at least one driveable transport vehicle;
said first end of said conveyor drive means comprising at least one chain drive wheel drivingly connected to said at least one conveying chain; and
said at least one chain drive wheel and said at least one toothed wheel being coaxially arranged with respect to each other.

5. The transport installation as defined in claim 4, wherein:
said support means at said at least one driveable transport vehicle having a predetermined width;
said chain conveyor comprises two conveying chains;
said two conveying chains being spaced by an amount exceeding the width of said support means at said at least one driveable transport vehicle and their related load bearing portions extending in said horizontal plane defined by said support means; and
said conveyor drive means comprising two toothed wheels and two chain drive wheels and said at least one driveable transport vehicle comprising two toothed racks, each said toothed wheel, each said chain drive wheel and each said toothed rack being operatively associated with a related one of said two conveying chains during said load transfer between said at least one driveable vehicle and said at least one reception station.

6. The transport installation as defined in claim 4, wherein:
said at least one reception station further comprises at least one mobile tension arm connected at said stationary frame;
said at least one mobile tension arm carrying said coaxially arranged at least one toothed wheel and at least one chain drive wheel; and
said at least one mobile tension arm being displaceably arranged at said stationary frame in order to tension said at least one conveying chain.

7. The transport installation as defined in claim 1, wherein:
said conveyor drive element at said at least one driveable transport vehicle comprises at least one friction surface extending thereat in the direction of said horizontal displacement;
said conveyor drive means comprising at least one friction wheel at said second end thereof; and
said at least one friction wheel at said conveyor drive means being frictionally drivingly connected to said at least one friction surface at said at least one driveable transport vehicle during said load transfer at said at least one reception station.

8. The transport installation as defined in claim 1, wherein:
said at least one driveable transport vehicle comprises a track-suspended driveable transport trolley;
said load support means comprising engageable and releasable attachment means for carrying said load at said driveable transport trolley; and
actuating means for actuating said attachment means in order to engage or release said attachment means to or from said load.

9. The transport installation as defined in claim 8, wherein:
said actuating means for actuating said attachment means in order to engage or release said attachment means to or from said load are located at said at least one reception station; and
said actuating means acting upon said attachment means at said at least one driveable transport trolley during said load transfer at said at least one reception station in order to release said attachment means from said load during transfer of the same from said driveable transport trolley to said load bearing portion of said endless conveyor and to engage said attachment means to said load during transfer of the same from said load bearing portion of said endless conveyor to said at least one driveable transport trolley.

10. The transport installation as defined in claim 1, wherein:
said conveyor drive means at said at least one reception station comprise a free-wheel clutch mechanism; and
said free-wheel clutch mechanism being operatively associated with said first end and said second end of said conveyor drive means in order to drivingly connect said first end of said conveyor drive means to said endless conveyor only in said preselected one of said two opposing directions of horizontal displacement of said at least one driveable transport vehicle.

11. The transport installation as defined in claim 1, wherein:

said at least one driveable transport vehicle is substantially horizontally displaceable in said two opposing horizontal directions at floor level;

said at least one driveable transport vehicle defining a longitudinal axis; and said load support means extending symmetrically with respect to said longitudinal axis of said transport vehicle.

12. The transport installation as defined in claim 5, wherein:

said stationary frame comprises two substantially parallel frame elements;

each said frame element carrying a selected one of said two conveying chains; and said two parallel frame elements being arranged in spaced relationship with respect to each other to permit said at least one driveable transport vehicle to pass therebetween during said load transfer at said reception station.

13. The transport installation as defined in claim 1, wherein:

said conveyor drive element at said at least one driveable transport vehicle extends laterally of said support means.

14. The transport installation as defined in claim 4, wherein:

said chain conveyor at said at least one reception station extends in the direction of said horizontal displacement of said at least one driveable transport vehicle; and said chain conveyor comprising at least two sprocket wheels arranged at opposed ends thereof and guide means at which said inclined load transfer portion of said chain conveyor branches off from said load bearing portion thereof.

15. The transport installation as defined in claim 8, wherein:

said conveyor drive means at said at least one reception station comprise a further chain conveyor defining said first end and said second end of said conveyor drive means; and said further chain conveyor including a chain wheel located at said first end thereof and drivingly connected to said endless conveyor, a drive wheel at said second end thereof and drivingly connectable to said conveyor drive element at said at least one driveable transport vehicle, and a drive chain drivingly interconnecting said chain wheel and said drive wheel.

16. The transport installation as defined in claim 15, wherein:

said chain wheel located at said first end of said further chain conveyor and drivingly connected to said endless conveyor constituting guide means at which said load transfer portion branches off from said load bearing portion of said endless conveyor.

* * * * *